US010252676B2

(12) United States Patent
Rossi

(10) Patent No.: US 10,252,676 B2
(45) Date of Patent: Apr. 9, 2019

(54) STORAGE BAG FOR USE WITH A TONNEAU COVER

(71) Applicant: TRUXMART LTD., Vaughan (CA)

(72) Inventor: Steven Rossi, Vaughan (CA)

(73) Assignee: WorkSport Ltd., Vaughn (CA)

( * ) Notice: Subject to any disclaimer, the term of this patent is extended or adjusted under 35 U.S.C. 154(b) by 0 days.

(21) Appl. No.: 15/524,167

(22) PCT Filed: Nov. 4, 2015

(86) PCT No.: PCT/CA2015/051138
§ 371 (c)(1),
(2) Date: May 3, 2017

(87) PCT Pub. No.: WO2016/070277
PCT Pub. Date: May 12, 2016

(65) Prior Publication Data
US 2017/0355317 A1    Dec. 14, 2017

Related U.S. Application Data

(60) Provisional application No. 62/074,942, filed on Nov. 4, 2014.

(51) Int. Cl.
| B60J 7/10 | (2006.01) |
| B60R 7/02 | (2006.01) |
| B60R 11/06 | (2006.01) |
| B60J 7/14 | (2006.01) |
| B62D 33/027 | (2006.01) |
| B60R 11/00 | (2006.01) |

(52) U.S. Cl.
CPC ............. *B60R 7/02* (2013.01); *B60J 7/141* (2013.01); *B60R 11/06* (2013.01); *B60R 2011/0059* (2013.01); *B60R 2011/0063* (2013.01); *B60R 2011/0084* (2013.01); *B62D 33/0273* (2013.01)

(58) Field of Classification Search
CPC .... B60R 7/02; B60R 7/005; B60J 7/10; B60J 7/141
See application file for complete search history.

(56) References Cited

U.S. PATENT DOCUMENTS

| 1,656,339 | A | * | 1/1928 | Runyan | ................... | B60R 7/043 |
| | | | | | | 224/275 |
| 2,577,263 | A | * | 12/1951 | Myers | ................... | B62D 25/12 |
| | | | | | | 224/311 |
| 3,473,680 | A | * | 10/1969 | Downer | ................. | B60R 11/06 |
| | | | | | | 224/311 |
| 5,366,124 | A | | 11/1994 | Dearborn, IV | | |
| 5,372,289 | A | | 12/1994 | Dachicourt | | |

(Continued)

OTHER PUBLICATIONS

International Search Report corresponding to PCT/CA2015/051138; Canadian Intellectual Property Office; dated Feb. 8, 2016.

(Continued)

*Primary Examiner* — Justin Larson
(74) *Attorney, Agent, or Firm* — Eric J. Sosenko; Jonathan P. O'Brien; Honigman LLP

(57) ABSTRACT

A storage bag for use with a tonneau cover is provided. The storage bag has a main body having at least one pocket, and at least one first fastener secured to the main body for releaseably fastening the main body to a bottom surface of a tonneau cover.

16 Claims, 15 Drawing Sheets

(56) References Cited

U.S. PATENT DOCUMENTS

| | | | | |
|---|---|---|---|---|
| 5,540,364 | A * | 7/1996 | Krieger | A45F 3/08 224/153 |
| 5,628,442 | A | 5/1997 | Wayne | |
| 6,070,775 | A | 6/2000 | Tolley et al. | |
| 6,302,463 | B1 * | 10/2001 | Moore | B60R 7/005 296/24.43 |
| 6,334,562 | B1 * | 1/2002 | Ament | B60R 7/005 224/404 |
| 6,435,586 | B2 * | 8/2002 | Getzschman | B60R 9/00 224/404 |
| 6,585,309 | B2 * | 7/2003 | Dicke | B60R 11/06 296/100.06 |
| D552,533 | S * | 10/2007 | Cord | D12/422 |
| D579,405 | S * | 10/2008 | Cord | D12/422 |
| D587,644 | S * | 3/2009 | Cord | D12/422 |
| 7,806,453 | B2 | 10/2010 | Aebker | |
| 7,819,451 | B2 * | 10/2010 | Yoshida | B60R 7/02 296/24.4 |
| 8,328,058 | B2 * | 12/2012 | Wilson | A45F 3/005 224/243 |
| 8,701,952 | B1 * | 4/2014 | Tripp | B60R 11/06 224/543 |
| 9,421,850 | B2 | 4/2016 | Shi et al. | |
| 9,527,451 | B2 * | 12/2016 | Krishnan | B60R 5/047 |
| 9,682,733 | B2 * | 6/2017 | Krishnan | B62D 33/042 |
| 9,701,251 | B2 * | 7/2017 | Parlow | B60R 7/02 |
| 2009/0180715 | A1 * | 7/2009 | Wittke-Kothe | A45F 4/02 383/4 |
| 2017/0355317 | A1 * | 12/2017 | Rossi | B60R 7/02 |

OTHER PUBLICATIONS

Written Opinion of the International Searching Authority corresponding to PCT/CA2015/051138; Canadian Intellectual Property Office; dated Feb. 8, 2016.

* cited by examiner

STORAGE BAG FOR USE WITH A TONNEAU COVER

TECHNICAL FIELD

The following relates generally to storage bags. In particular, the following relates to a storage bag for use with a tonneau cover.

SUMMARY

In one aspect, a storage bag for use with a tonneau cover is provided, comprising a main body having at least one pocket, and at least one first fastener secured to the main body for releaseably fastening the main body to a bottom surface of a tonneau cover.

The at least one pocket can be sealable to inhibit objects placed therein from falling out when the storage bag is fastened to the bottom surface of the tonneau cover and the pickup truck is operated.

The main body can be generally rectangular and dimensioned to generally match the cross-section of a cargo box of a pickup truck.

The storage bag can further comprise at least one second fastener secured to the main body for releaseably fastening the main body to the bottom surface of the tonneau cover to hold the main body generally against the tonneau cover. The at least one second fastener can comprise at least one strap.

The storage bag can further comprise at least one second fastener secured to the main body for releaseably fastening the main body to features of the cargo box of the pickup truck so that the storage bag restricts movement of an object in the pickup truck bed. The at least one second fastener can comprise at least one closeable hook securable to a loop along the bed of the pickup truck.

The storage bag further comprise at least one strap or handle secured to the main body for carrying the storage bag when unfastened from the tonneau cover. The at least one strap or handle can be releaseably secured to the main body.

The main body can be conditioned between an expanded state in which the at least one first fastener can be releaseably fastened to the tonneau cover and a folded state, the storage bag can further comprise a securing mechanism for holding the main body in the folded state. The securing mechanism can comprise a zipper.

The at least one first fastener can comprise a first zipper portion complementing a second zipper portion secured to the bottom surface of the tonneau cover.

The at least one first fastener can comprise a first hook-and-loop fastener portion complementing a second hook-and-look fastener portion secured to the bottom surface of the tonneau cover.

The storage bag can further comprise an adapter member securable to the bottom surface of the tonneau cover. The adapter member can have a portion having a larger profile that is received in a channel of the tonneau cover. The adapter member can comprise at least one drawer slider to which the storage bag is releaseably fastened to adjustably position the storage bag. The adapter member can comprise at least one track secured to the bottom surface of the tonneau cover for adjustably positioning the storage bag.

These and other aspects are contemplated and described herein. It will be appreciated that the foregoing summary sets out representative aspects of a storage bag for use with a tonneau cover to assist skilled readers in understanding the following detailed description.

BRIEF DESCRIPTION OF THE DRAWINGS

A greater understanding of the embodiments will be had with reference to the Figures, in which:

FIG. 10 shows the storage bag of FIG. 7 fastened to both the tonneau cover and the interior of the cargo box of the pickup truck to act as a cargo box divider;

DETAILED DESCRIPTION

Figure 1:
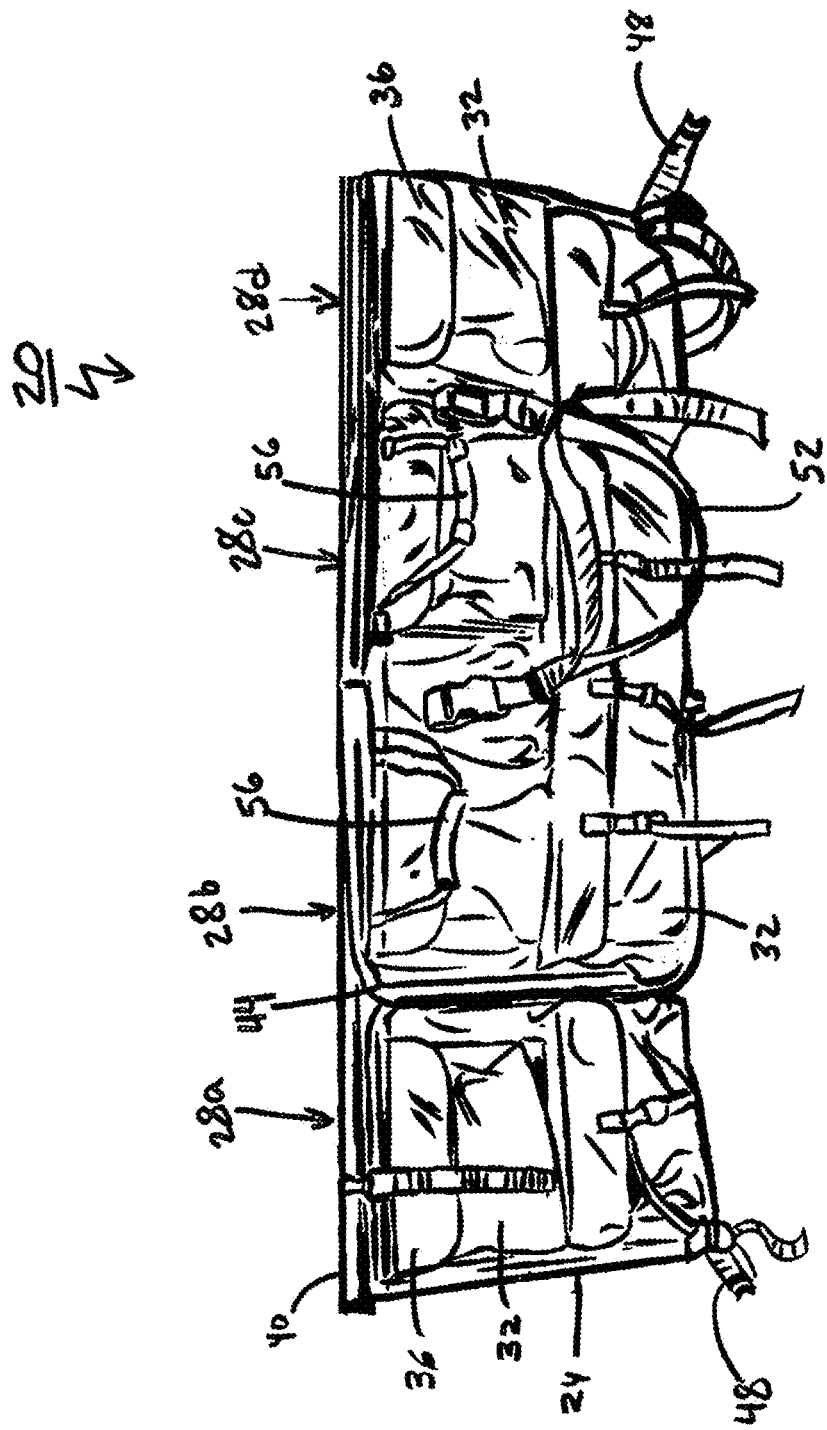
FIG. 1 is a front perspective view of a storage bag for use with a tonneau cover in accordance with one embodiment thereof.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The following provides a storage bag for use with a tonneau cover. The described storage bag comprises a main body having at least one pocket, and at least one first fastener. The at least one first fastener is secured to the main body and releaseably fastens the main body to a bottom surface of a tonneau cover. The storage bag can thus be unfastened from the tonneau cover and serve as a portable storage bag for tools, trade goods, etc. The storage bag provides a means for safely storing smaller objects in the truck cargo box.

A storage bag 20 in accordance with an embodiment is shown in FIG. 1. Storage bag 20 has a main body 24 that is generally rectangular, having a width that is marginally smaller than the inner width (that is, generally matching the cross-section) of a cargo box of a pickup truck and a height that generally corresponds with the depth of a cargo box. Main body 24 has four bag sections 28a, 28b, 28c, and 28d. A plurality of storage pockets 32 are positioned on the four bag sections 28a, 28b, 28c, and 28d so that they generally do not span two or more of bag sections 28a, 28b, 28c, and 28d. Storage pockets 32 have pocket flaps 36 that seal pockets 32 via hook-and-loop fabric strips to secure the contents held therein.

A fastening strip 40 borders the top of main body 24 and includes fasteners for releaseably fastening storage bag 20 to a tonneau cover.

A zippered flange 44 borders the second and third bag sections 28b and 28c. Zippered flange 44 has a pair of zipper portions, one on each of bag sections 28b and 28c that are mated and closed to hold together storage bag 20 in a folded state.

A pair of fasteners in the form of anchor straps 48 extend from the bottom corners of main body 24. Anchor straps 48 are for releaseably fastening the bottom corners of storage bag 20 to the cargo box at a lower position therein or to a bottom surface of a tonneau cover.

Storage bag 20 is generally made of ballistic nylon that is resistant to fatigue and piercing from sharp objects placed into pockets 32.

In order to facilitate carrying of storage bag 20 when in a folded state, a shoulder strap 52 is secured to either side of bag section 28c of main body 24 via a pair of snap latches. In addition, a pair of handles 56 are attached to bag sections 28b and 28c.

Figure 2:
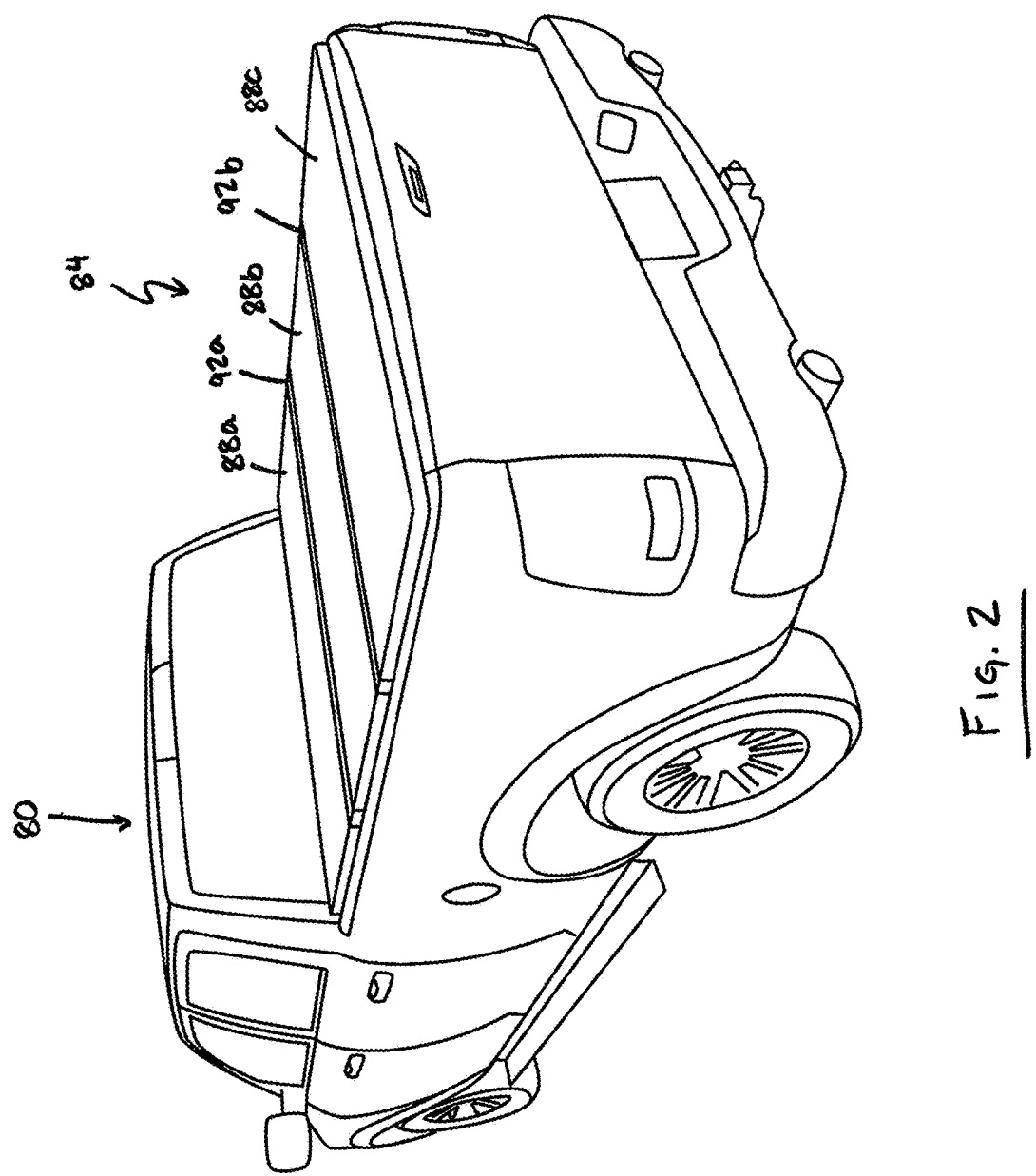
FIG. 2 is a rear perspective view of an articulating tonneau cover deployed on a pickup truck.

FIG. 2 shows a pickup truck 80 having an exemplary tonneau cover 84 installed over the cargo box with which storage bag 20 can be used. Tonneau cover 84 includes a set of tonneau sections 88a, 88b, and 88c with spacer members 92a and 92b therebetween.

Figure 3:
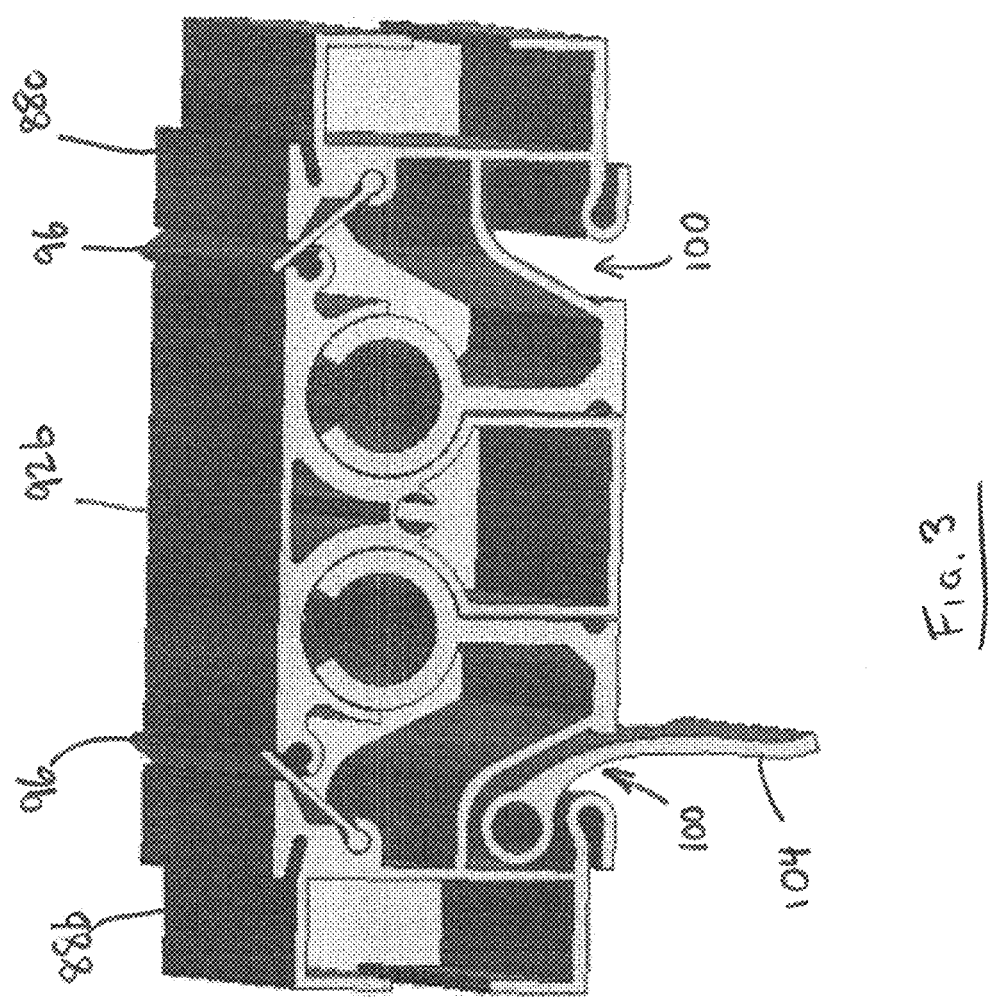
FIG. 3 shows a portion of a cross-section of a spacer member and adjacent tonneau sections of FIG. 2.

FIG. 3 shows a partial cross-sectional view of spacer member 92b and adjacent tonneau sections 88b and 88c. Rubber seals 96 are employed between spacer member 92a and adjacent tonneau sections 88b and 88c to maintain a water-resistant seal between them. A channel 100 is present on the bottom surface of each of tonneau sections 88b and 88c proximal to spacer member 92b. Each tonneau section 88 has two channels 100, one proximal each long edge on its bottom surface.

An adapter member 104 is shown inserted into channel 100 of tonneau section 88b. Adapter member 104 enables storage bag 20 to be releaseably fastened to the bottom surface of tonneau section 88b. Adapter member 104 is made from a fabric such as nylon and has a portion having a larger profile that can be securely held within channel 100.

In particular, a semi-rigid tube 106 is secured thereto along the top edge of adapter member 104. Semi-rigid tube 106 resists deformation sufficiently to hold adapter member 104 within channel 100 when normal loads are put into storage bag 20 when fastened to adapter member 104.

Figure 4:
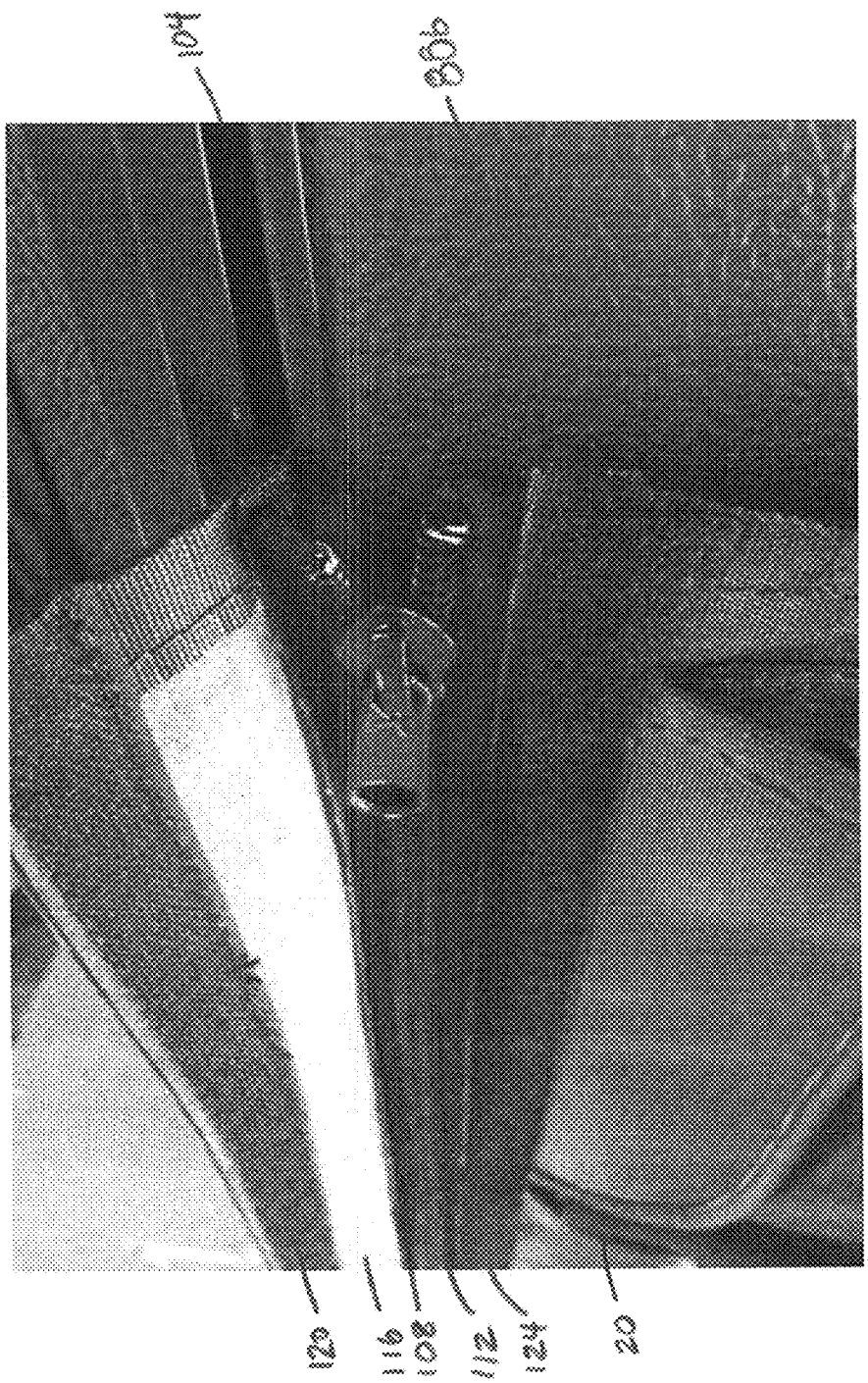
FIG. 4 shows the storage bag partially secured to the tonneau section of the tonneau cover of FIG. 2.

Referring now to FIG. 4, storage bag 20 is shown secured to adapter member 104 that is inserted into channel 100 of tonneau section 88b. In particular, adapter member 104 has a zipper portion 108 that corresponds with a zipper portion 112 of fastening strip 40 of storage bag 20. In addition, adapter member 104 has a flap 116 that has a hook-and-loop fabric strip 120 on its underside. Storage bag 20 has a corresponding hook-and-loop fabric strip 124 on fastening strip 40 below zipper portion 112.

Figure 5:
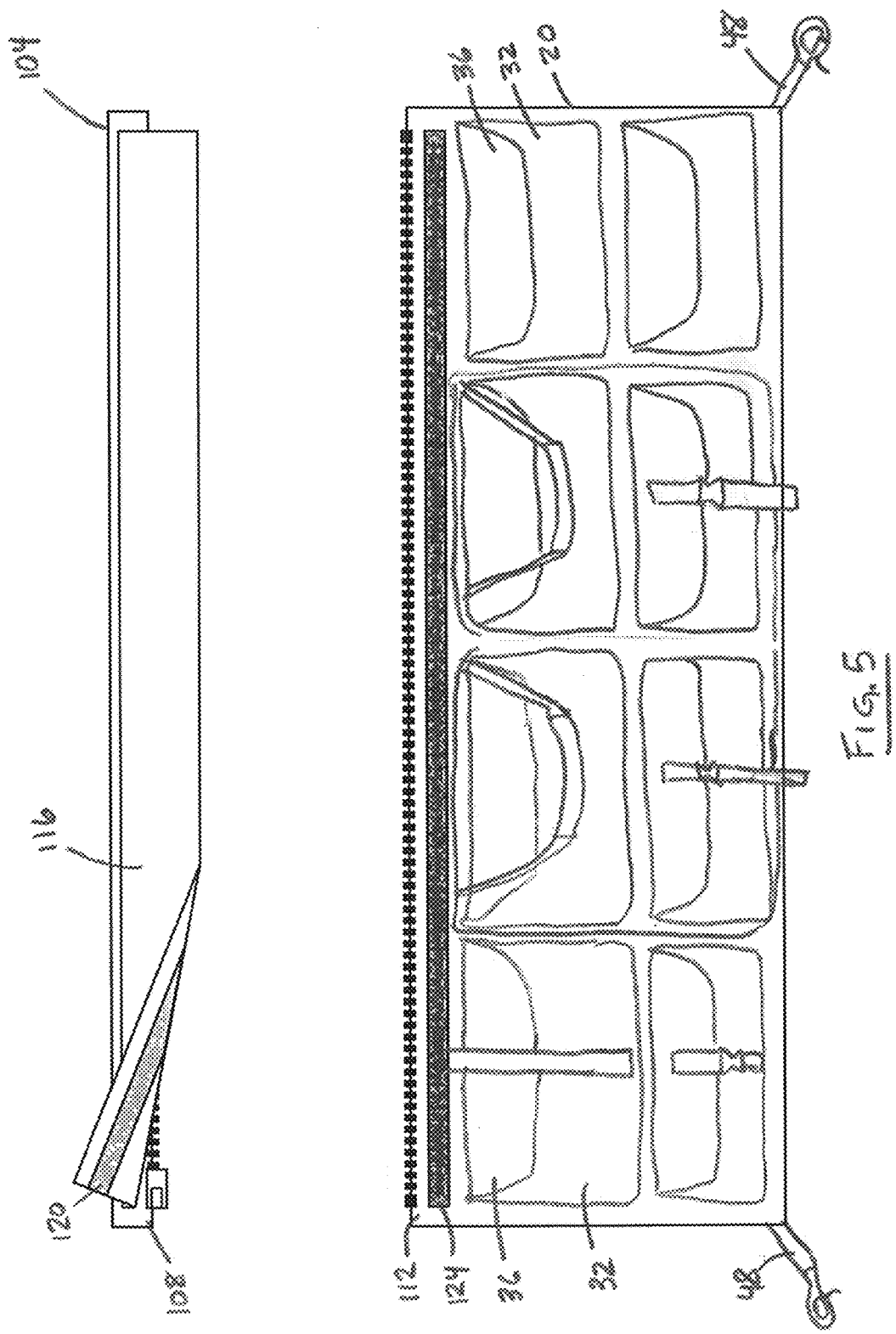
FIG. 5 shows the storage bag of FIG. 4 and an adapter member isolated from the tonneau cover.

Storage bag 20 and the adapter member 104 are shown separated in FIG. 5. As shown, anchor straps 48 have closeable hooks to enable them to be releaseably fastened to features inside the cargo box.

In order to secure storage bag 20 to the bottom surface of tonneau cover 84, adapter member 104 is slid into an open end of channel 100 of one of tonneau sections 88a, 88b, and 88c. Zipper portion 112 of storage bag 20 is then aligned with zipper portion 108 of adapter member 104 and mated with it to close the zipper. Flap 116 is then turned down to enable hook-and-look fabric strips 120 and 124 to mate. Flap 116 when closed deters accidental separation of zipper portions 108 and 112. To release storage bag 20 from tonneau cover 84, flap 116 is lifted to separate hook-and-loop fabric strips 120 and 124, and then zipper portions 108 and 112 are separated by opening the zipper. Upon unmating zipper portions 108 and 112, storage bag 20 may be taken away from tonneau cover 84.

Figure 6:
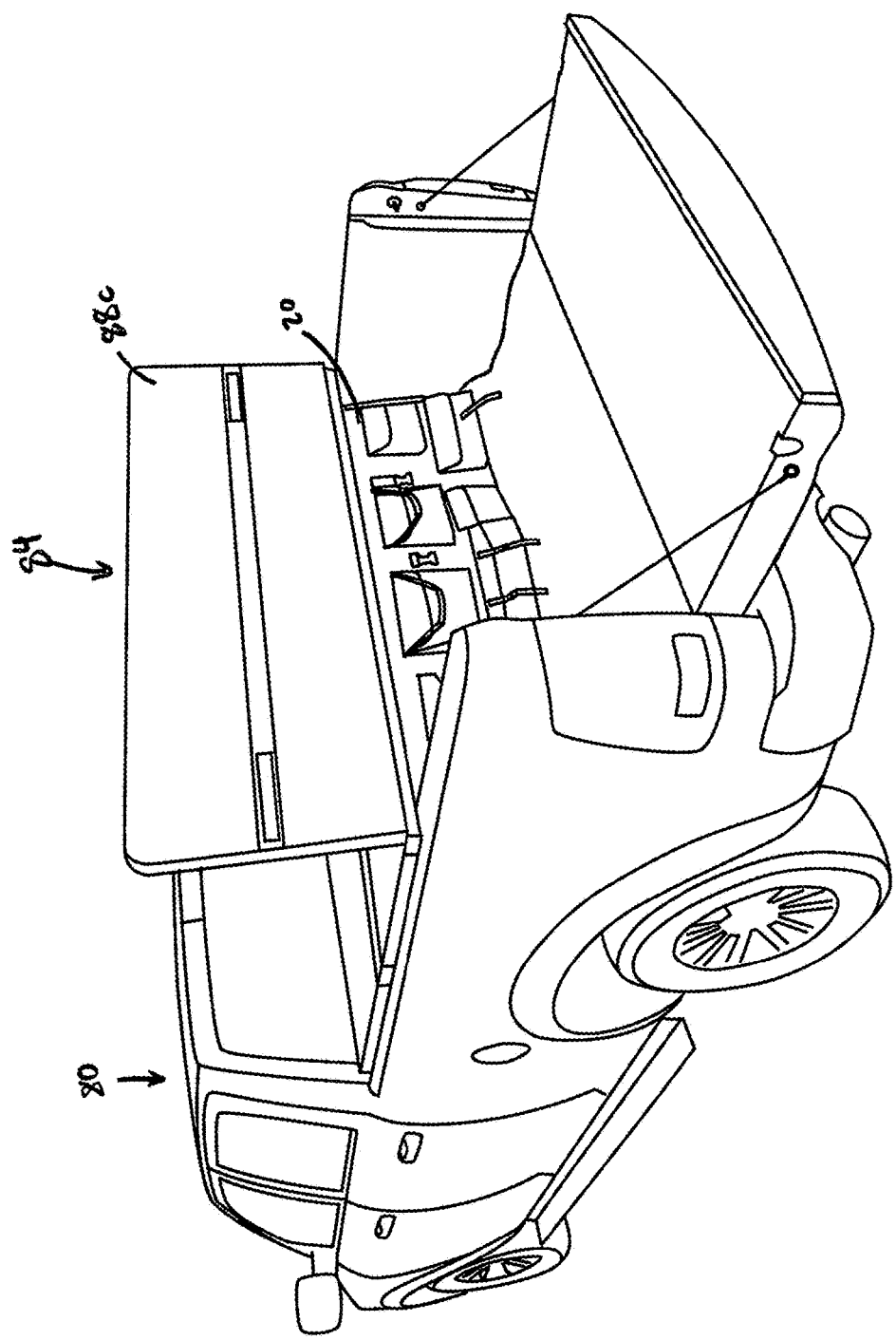
FIG. 6 shows the tonneau cover of FIG. 2 with a back tonneau section pivoted upwards.

FIG. 6 illustrates storage bag 20 held underneath tonneau cover 84 of FIG. 2 as tonneau cover 84 is partially opened. As shown, storage bag 20 depends down from the rear edge of tonneau section 88b.

Figure 7:
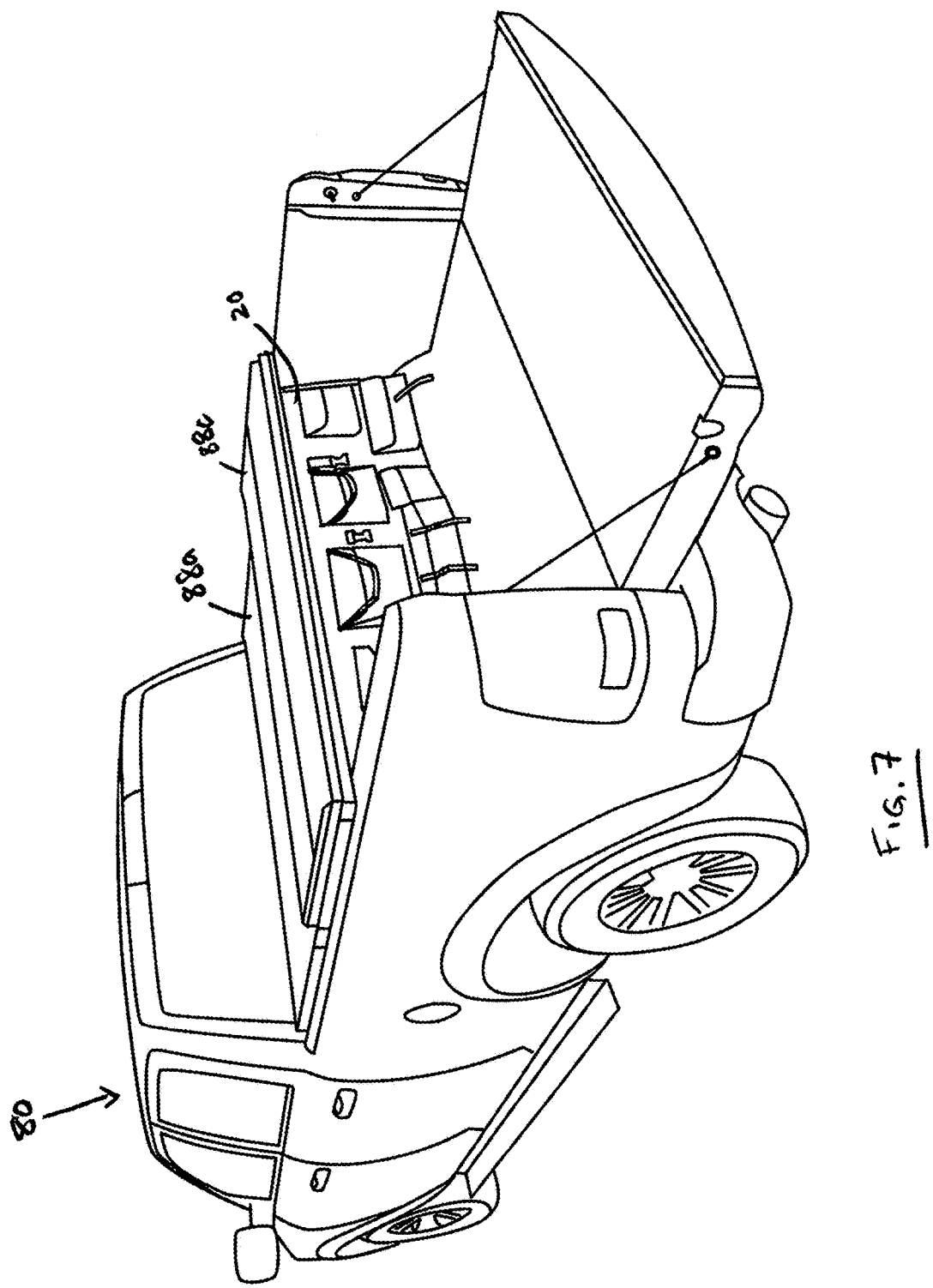
FIG. 7 shows the tonneau cover of FIG. 6 further opened, thereby providing access to the storage bag.

FIG. 7 shows the position of storage bag 20 as tonneau cover 84 is further opened by stacking tonneau section 88c atop of tonneau section 88b. In this position of tonneau cover 84, full access to storage bag 20 depending therefrom is provided.

Figure 8:
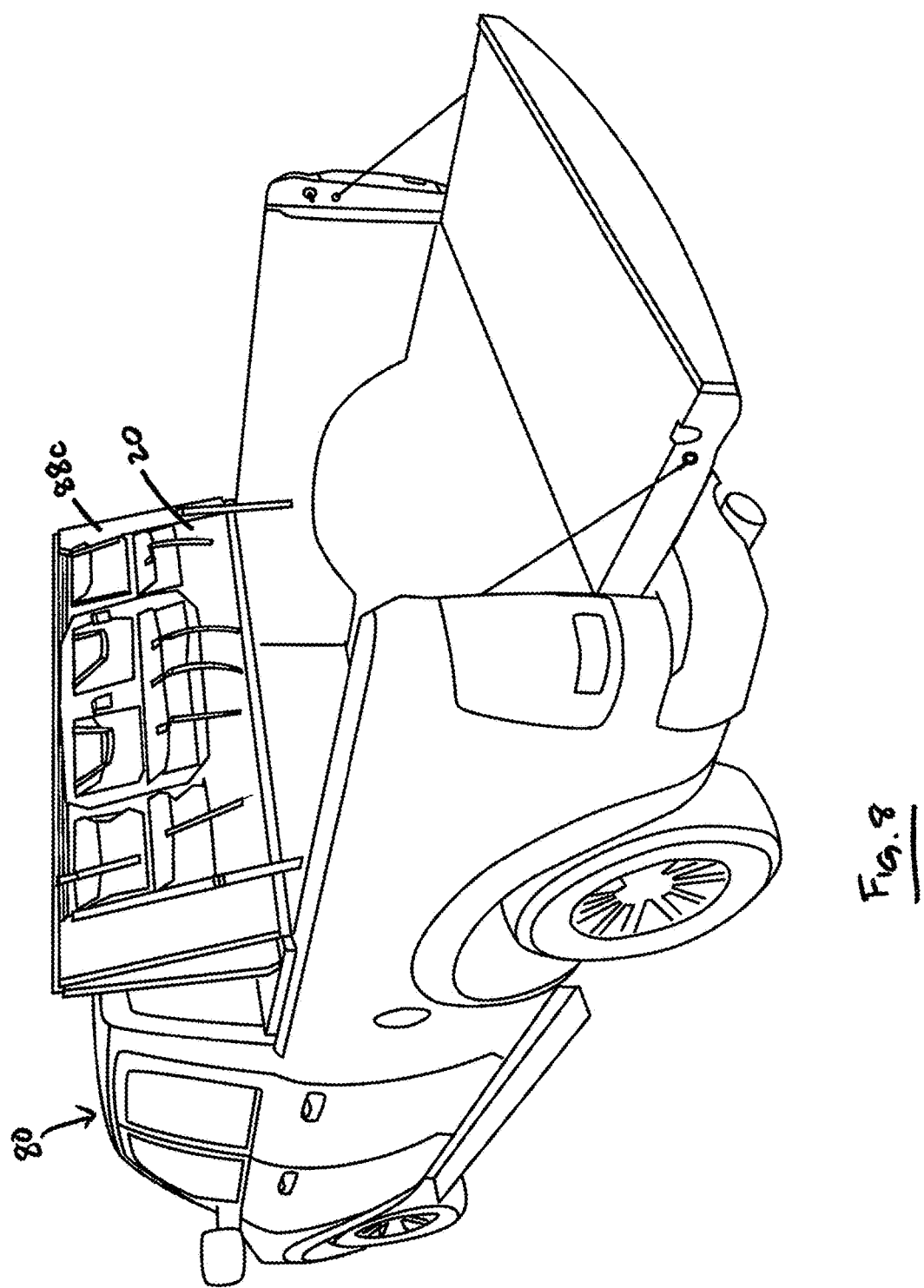
FIG. 8 shows the tonneau cover of FIG. 7 still further opened, thus elevating the storage bag fastened thereto out of the cargo box of the pickup truck.

FIG. 8 shows tonneau cover 84 further opened. In particular, tonneau section 88b to which storage bag 20 is fastened has been pivoted upward and forward, elevating storage bag 20 out of the cargo box of pickup truck 80.

Figure 9:
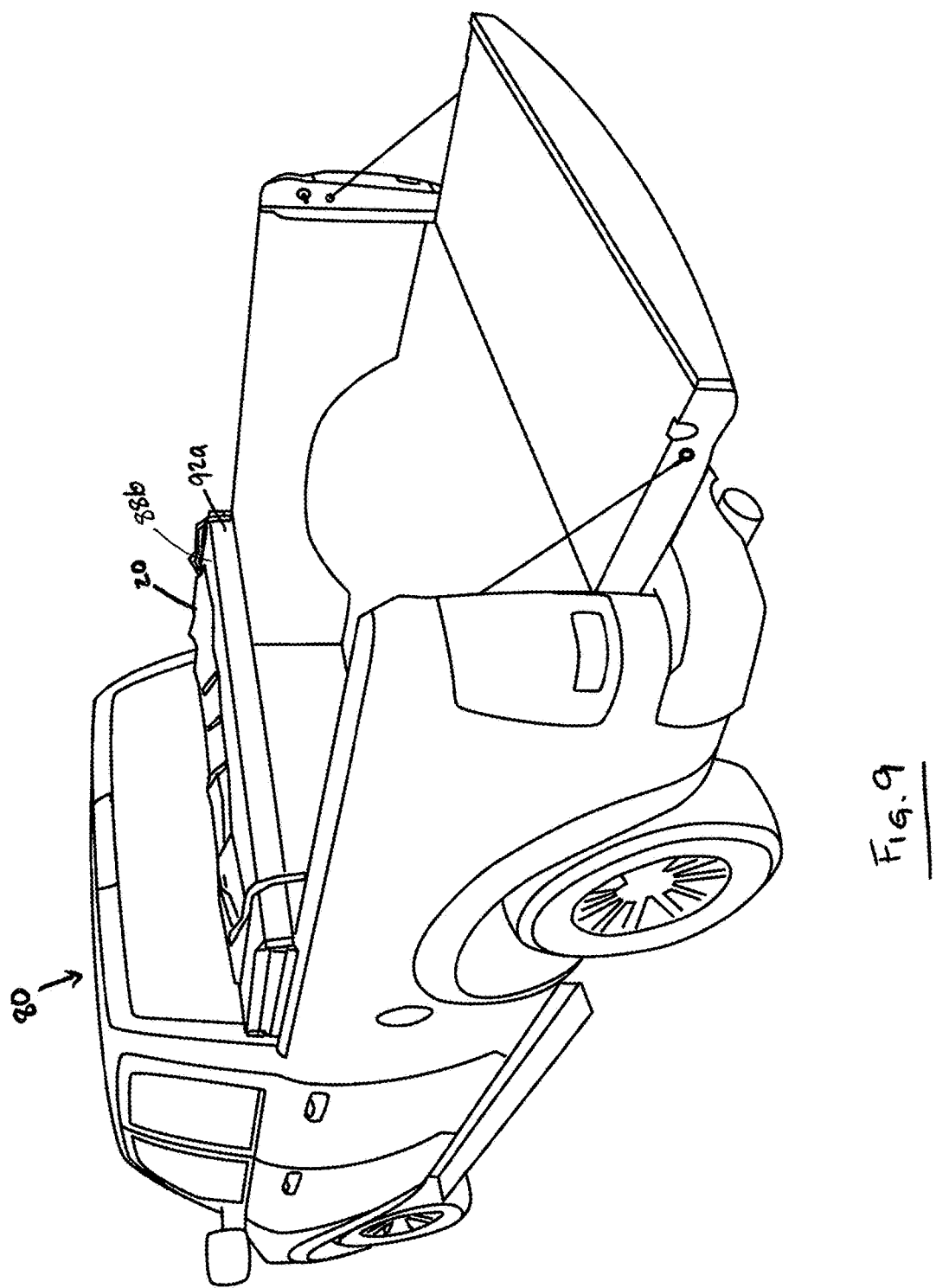
FIG. 9 shows the tonneau cover of FIG. 8 still yet further opened, wherein the storage bag rests atop of the stacked tonneau sections of the tonneau cover.

FIG. 9 illustrates tonneau cover 84 still further opened. Tonneau sections 88b and 88c are stacked in a nested manner atop of tonneau section 88a. The bottom surface of tonneau section 88b is oriented facing up, and storage bag 20 fastened to it is resting atop of it. In this position, the contents of pockets 32 of storage bag 20 can readily be accessed.

FIG. 10 shows storage bag 20 having been fastened to the bottom surface of tonneau cover 84 and also having been fastened to loops 128 along the lower portion of the cargo box via anchor straps 48. By fastening storage bag 20 at a lower end thereof to lower points in the cargo box, storage bag 20 can act as a divider for limiting movement of cargo items placed in the cargo box from moving past storage bag 20.

Figure 11A:
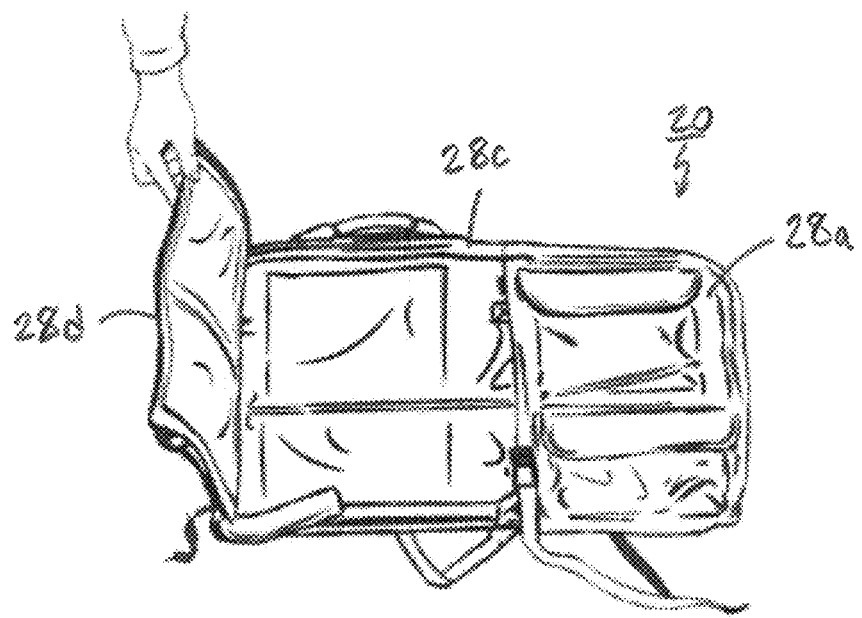
FIGS. 11a to 11c show the folding and zipping of the storage bag of FIG. 1 unfastened from the tonneau cover to form a carrying bag.
Figure 11B:
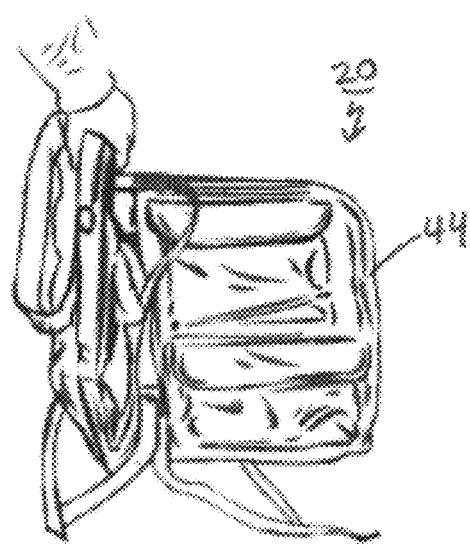
Figure 11C:
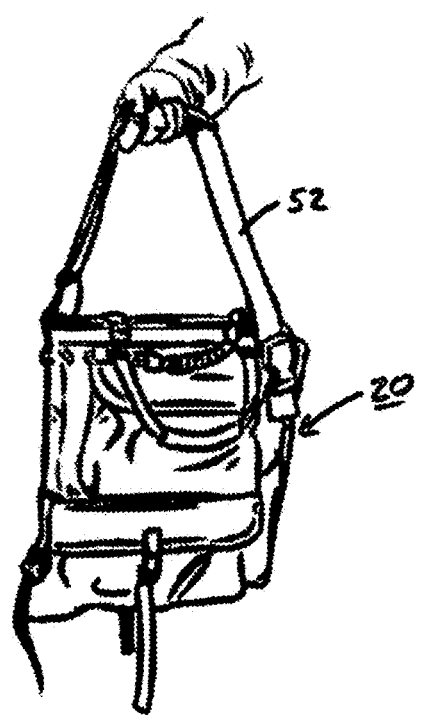

FIGS. 11a to 11c show the method of folding storage bag 20 to make it more readily portable.

In FIG. 11a, storage bag 20 is shown in a partially-folded state, wherein bag section 28a was previously folded over onto bag section 28b so that pockets 32 remain on the outside. Bag section 28d is shown being folded onto bag section 28c. As pockets 32 do not generally span two or more bag sections 28, contents placed therein are less likely to interfere with the folding of bag sections 28 into a stack.

In FIG. 11b, stacked bag sections 28c and 28d are being folder over onto stacked bag sections 28a and 28b. Once bag sections 28c and 28d are folded over onto bag sections 28a and 28b, zippered flange 44 is pulled forward over folded bag sections 28 so that the zipper portions of zippered flange 44 can be closed.

FIG. 11c shows storage bag 20 in a closed folded state being held by shoulder strap 52.

Figure 12:
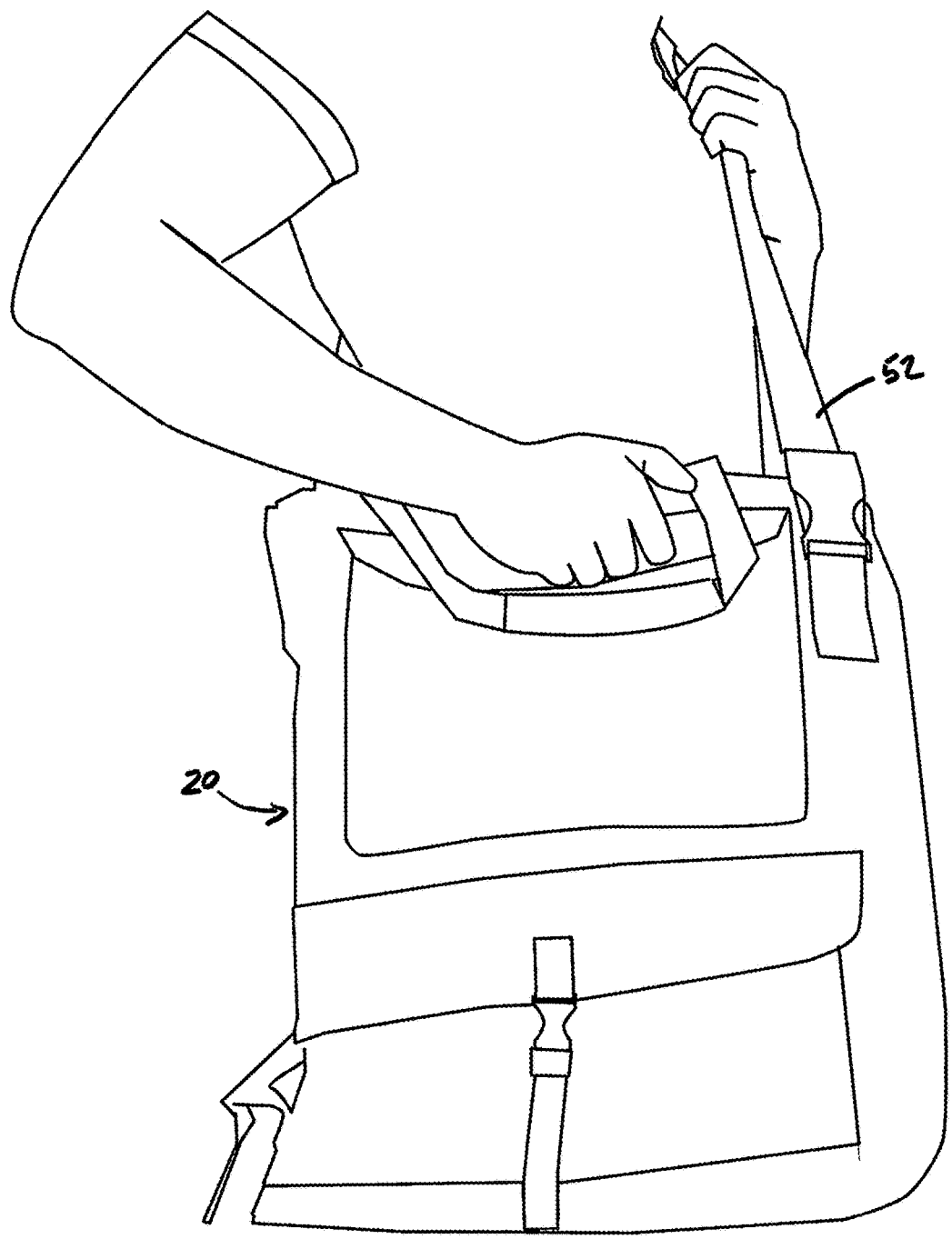
FIG. 12 shows the folded and zipped storage bag of FIG. 11c being carried over the shoulder of a person.

FIG. 12 shows folded closed storage bag 20 being carried over the shoulder via shoulder strap 52 by a person.

Figure 13:
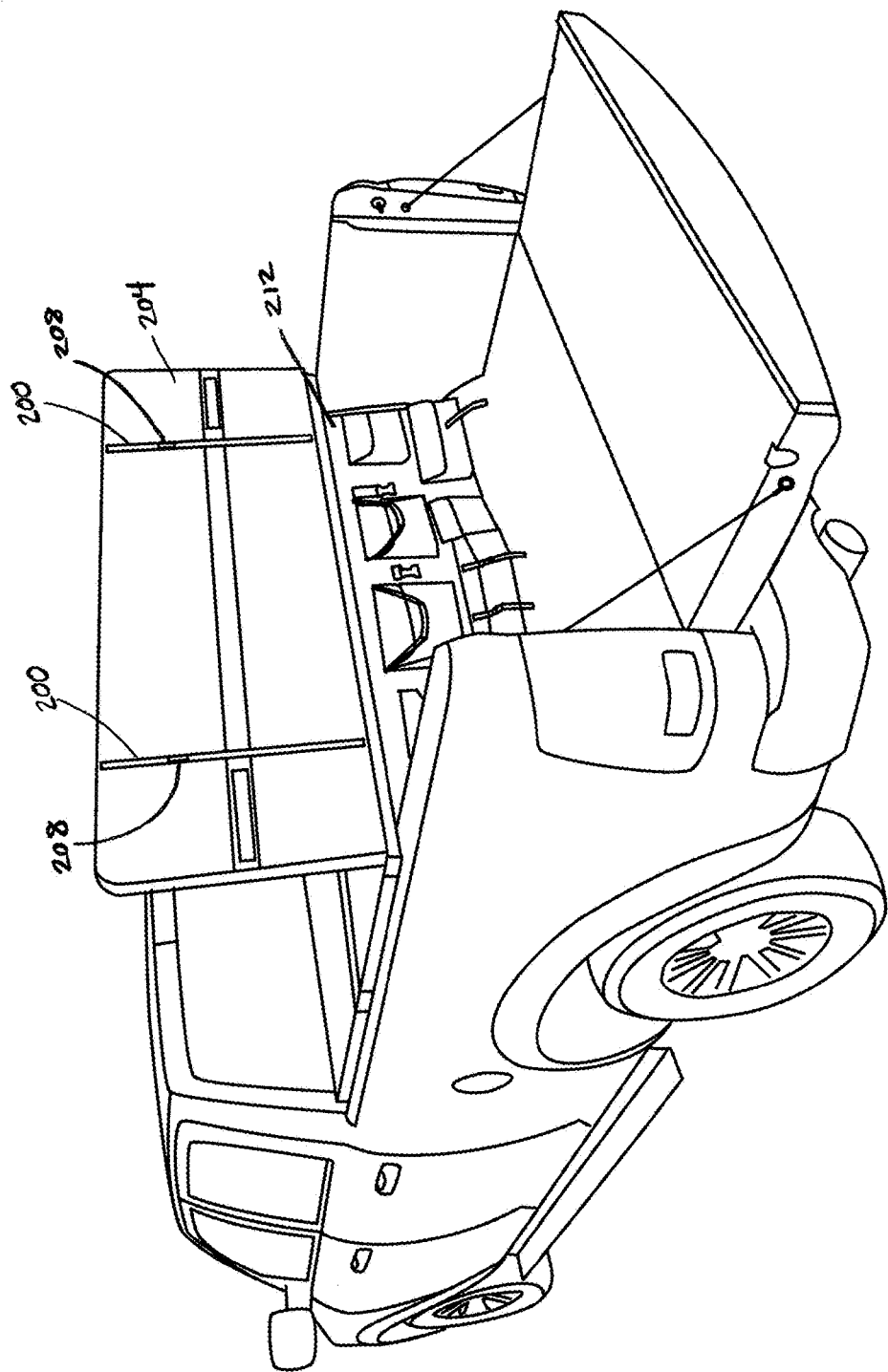
FIG. 13 shows an adjustable storage bag positioning system in accordance with another embodiment.

FIG. 13 shows a storage bag positioning system in accordance with an alternative embodiment. A pair of adapter members 200 is secured to a bottom surface of one or more tonneau section 204. Adapter members 200 include tracks along which the position of fastening points 208 can be adjusted, such as, for example, via the tightening and loosening of a screw to secure the fastening points in place along the tracks. As will be appreciated, a storage bag 212 is shown releaseably fastened to fastening points 208 along adapter members 200 secured to a bottom surface of an intermediate tonneau section 204.

Figure 14:
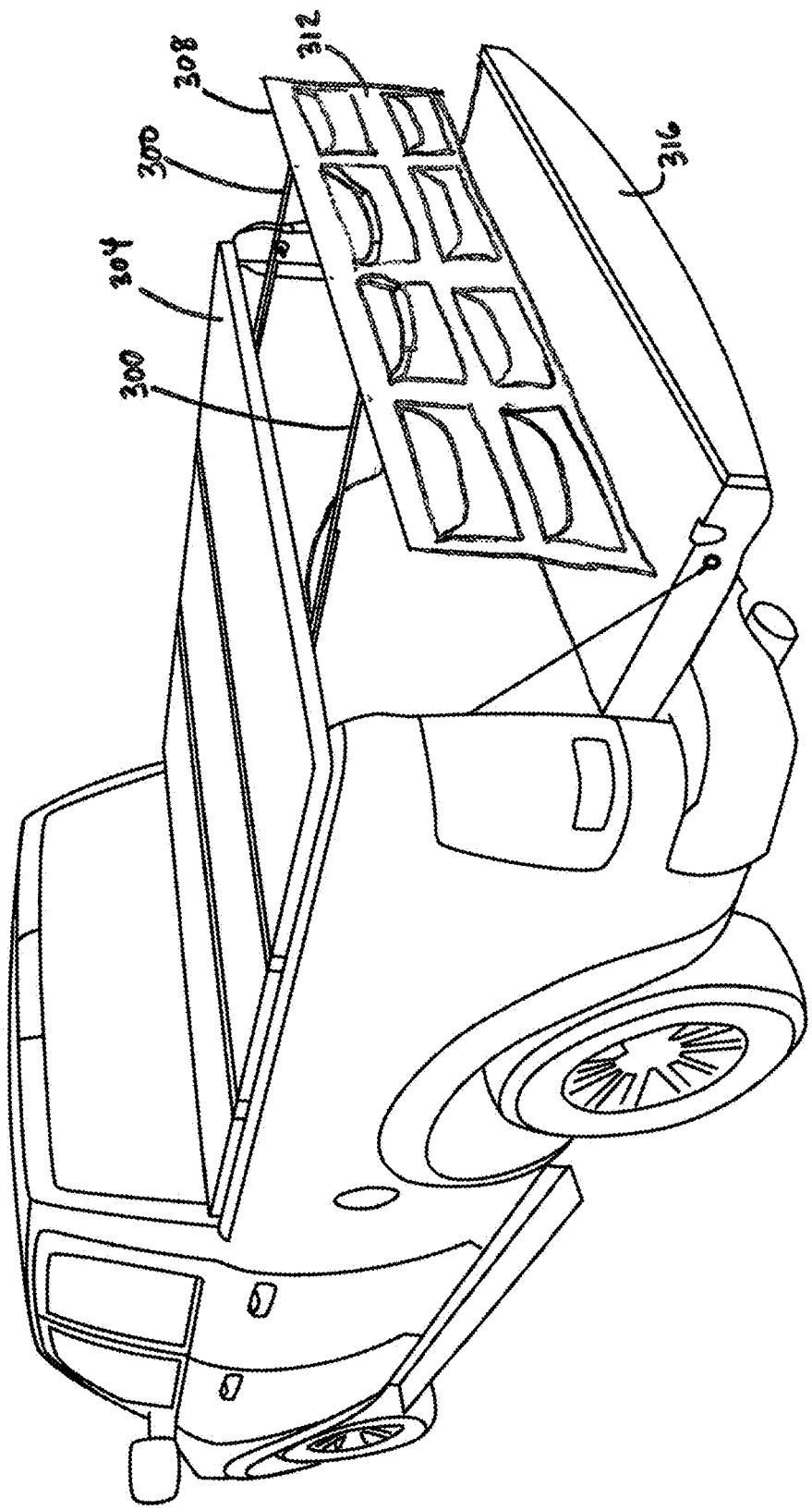
FIG. 14 shows an extendible storage bag positioning system in accordance with yet another embodiment.

FIG. 14 shows an extendible storage bag positioning system in accordance with another alternative embodiment. A pair of heavy-duty drawer slides 300 is secured to a bottom surface of a rearmost tonneau section 304. An attachment bar 308 of a length to generally span the inside width of a cargo box is secured to ends of the drawer slides 300. A storage bag 312 is releaseably fastened to the attachment bar 308 via straps or other suitable means, such as hook-and-loop fabric strips, zippers, etc. When a tailgate 316 of the pickup truck is opened, the storage bag 312 can be positioned backwards towards the end of the tailgate 316 to facilitate access to the contents of its pockets. Further, the storage bag 312 can be unfastened and carried away. When not in use, the storage bag 312 can be pushed back into the cargo box of the pickup truck, thus contracting the drawer slides 300, before the tailgate 316 is closed.

While, in the embodiment described above, a storage bag is fastened to a bottom surface of a tonneau cover by fastening it via a zipper and hook-and-loop fabric to an adapter member fastened to the tonneau cover, it will be appreciated that a storage bag can be fastened releaseably to a bottom surface of a tonneau cover in other ways. The tonneau cover can be provided with loops, hook-and-loop fabric or other attachment means to which the storage bag can be releaseably fastened. The storage bag can be releaseably fastened via one or more of zippers, hook-and-loop fabric, snaps, latches, closeable hooks, buttons, etc. Soft and roll-up tonneau covers can have frames and/or cross-members, and the storage bag may be releaseably fastened to the frame, cross-members, and/or tonneau membrane via straps, hook-and-loop fabric strips, etc. Other methods will occur to those skilled in the art.

Similarly, the storage bag can be anchored to the lower part of the cargo box via straps tied to loops, clamps, snaps, closeable hooks, buttons, etc.

The storage bag can alternatively be made to be anchored to the tonneau cover to hold the storage bag against one or more tonneau sections. For example, a secondary adapter member similar to that described above can be used to fasten the storage bag's lower end to the tonneau cover.

The storage bag can be made from materials other than nylon, such as leather, a mesh material where larger objects are to be stored therein, etc.

The pockets of the storage bag can be sealed via means other than hook-and-loop fabric, such as snaps, snap latches, buttons, zippers, etc.

Other methods of folding or otherwise compacting the storage bag for carrying will occur to those skilled in the art. For example, while the storage bag described above is described as having four bag sections that fold to one another, more or less bag sections could be folded together to compact the storage bag for carrying.

Other types of fasteners can be employed to hold the storage bag in a folded state, such as straps, snaps, hook-and-loop fabric, etc.

The storage bag may be separable into two or more segments. For example, the bag sections of the storage bag may be releaseably secured together via a zipper, snaps, etc. It may be desirable to remove only a portion of the storage bag to carry.

Although the invention has been described with reference to certain specific embodiments, various modifications thereof will be apparent to those skilled in the art. The scope of the claims should not be limited by the preferred embodiments, but should be given the broadest interpretation consistent with the description as a whole.

The invention claimed is:

1. A storage bag and a tonneau cover assembly, comprising:
   a tonneau cover; and
   a storage bag mounted to the tonneau cover, the storage bag including a main body having at least one pocket; and
   at least one first fastener releasably securing the main body to a bottom surface of a tonneau cover, the first fastener including releasably engaged first and second fastener portions, the first fastener portion mounted to the bottom of the tonneau cover and depending below the bottom of the tonneau cover, the second fastener portion mounted to the main body and releasably engaging the first fastener portion at a location beneath the bottom of the tonneau cover,
   whereby the second faster portion and the main body of the storage bag can be removed from the tonneau cover while the first fastener portion remains mounted thereto.

2. The storage bag and tonneau cover assembly of claim 1, wherein the at least one pocket is sealable to inhibit objects placed therein from falling out when the storage bag is fastened to the bottom surface of the tonneau cover and the pickup truck is operated.

3. The storage bag and tonneau cover assembly of claim 1, wherein the main body is generally rectangular and dimensioned to generally match the cross-section of a cargo box of a pickup truck.

4. The storage bag and tonneau cover assembly of claim 3, further comprising:
   at least one second fastener secured to the main body for releaseably fastening the main body to the bottom surface of the tonneau cover whereby the main body generally held against the tonneau cover.

5. The storage bag and tonneau cover assembly of claim 4, wherein the at least one second fastener comprises: at least one strap.

6. The storage bag and tonneau cover assembly of claim 3, further comprising:
   at least one second fastener secured to the main body, the second fastener configured to releaseably fasten the main body to features of the cargo box of the pickup truck so that the storage bag restricts movement of an object in the pickup truck bed.

7. The storage bag and tonneau cover assembly of claim 6, wherein the at least one second fastener comprises: at least one closeable hook securable to a loop along the bed of the pickup truck.

8. The storage bag and tonneau cover assembly of claim 1, further comprising:
at least one of a strap and a handle secured to the main body for carrying the storage bag when unfastened from the tonneau cover.

9. The storage bag and tonneau cover assembly of claim 8, wherein the at least one of the strap and the handle is releaseably secured to the main body.

10. The storage bag and tonneau cover assembly of claim 1, wherein the main body can be conditioned between an expanded state and a folded state, in the expanded state the second fastener portion being releasably fastened to the first fastener portion, and, the storage bag further comprising:
a securing mechanism configured to retain the main body in the folded state.

11. The storage bag and tonneau cover assembly of claim 10, wherein the securing mechanism comprises a zipper.

12. The storage bag and tonneau cover assembly of claim 1, wherein the first fastener portion includes a first zipper portion and the second fastener portion includes a second zipper portion, the first and second zipper portions being matingly engageable.

13. The storage bag and tonneau cover assembly of claim 1, wherein the first fastener portion comprises:
a first hook-and-loop fastener portion complementing a second hook-and-look fastener portion of the second fastener portion.

14. A storage bag and a tonneau cover assembly, comprising:
a tonneau cover having adjacent tonneau sections, the tonneau sections including ends rails rotatably engaged with a spacer; and
a storage bag mounted to the tonneau cover, the storage bag including a main body having at least one pocket; and
at least one first fastener securing the storage bag to a bottom surface of a tonneau cover, the first fastener including releasably engaged first and second fastener portions, the first fastener portion extends below the bottom of the tonneau cover and includes an adapter member secured to the bottom surface of the tonneau cover, the second fastener portion mounted to the main body and releasably engaging the first fastener portion at a location beneath the bottom of the tonneau cover, whereby the second faster portion and the main body of the storage bag can be removed from the tonneau cover while the first fastener portion remains mounted thereto.

15. The storage bag and tonneau cover assembly of claim 14, wherein the adapter member has an end portion with an enlarged profile, the end portion being received in a channel defined by one of the end rails of the tonneau sections.

16. A storage bag and a tonneau cover assembly, comprising: a tonneau cover having adjacent tonneau sections, the tonneau sections including ends rails rotatably engaged with a spacer; and a storage bag mounted to the tonneau cover, the storage bag including a main body having at least one pocket; and at least one first fastener securing the storage bag to a bottom surface of a tonneau cover, the first fastener including releasably engaged first and second fastener portions, the first fastener portion extending below the bottom of the tonneau cover and including an adapter member secured to the bottom surface of the tonneau cover, the second fastener portion being mounted to the main body and releasably engaging the first fastener portion at a location beneath the bottom of the tonneau cover, whereby the second faster portion and the main body of the storage bag can be removed from the tonneau cover while the first fastener portion remains mounted thereto; wherein the adapter member comprises at least one track secured to the bottom surface of the tonneau cover for adjustably positioning the storage bag along the track, the storage bag extending transversely to the track and being fastened to at least one fastening point along said at least one track.

* * * * *